Sept. 2, 1924.
J. M. MILLER
BLADE
Filed March 9, 1923
1,506,937
2 Sheets-Sheet 1
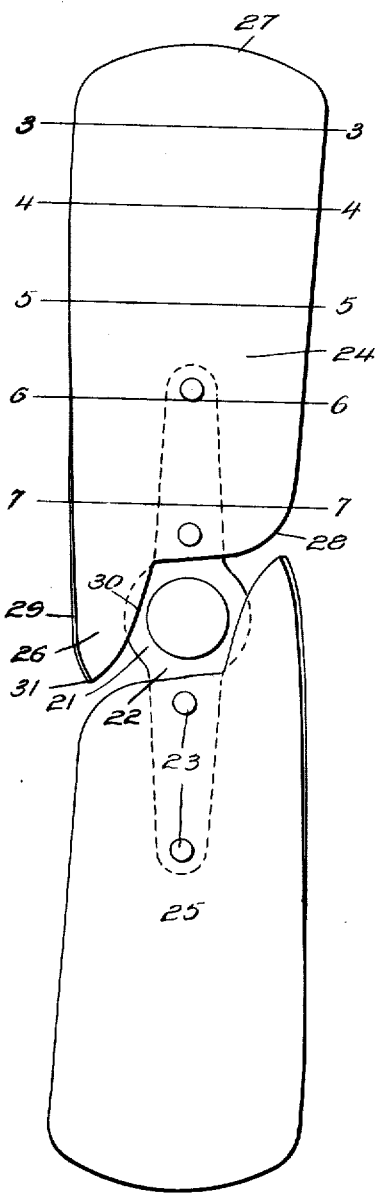
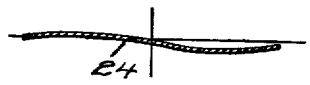
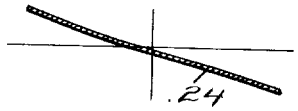
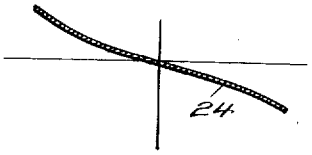
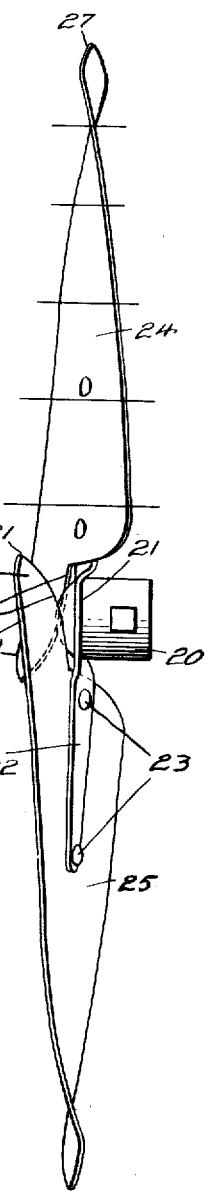
INVENTOR.
James M. Miller.
BY
Geo. P. Kimmel.   ATTORNEY.

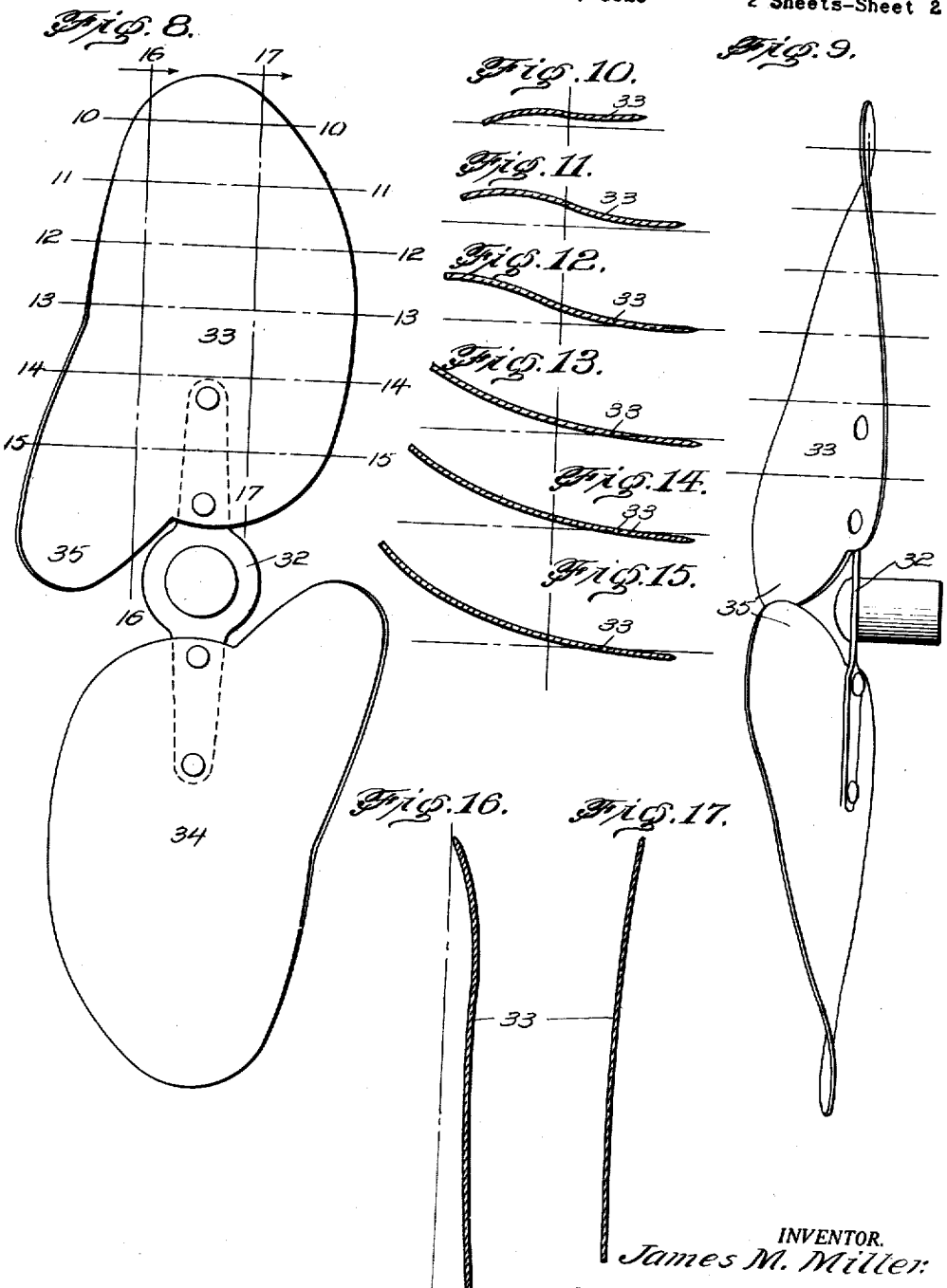

Patented Sept. 2, 1924.

1,506,937

UNITED STATES PATENT OFFICE.

JAMES M. MILLER, OF WASHINGTON, DISTRICT OF COLUMBIA, ASSIGNOR OF ONE-HALF TO TOM MOORE, OF WASHINGTON, DISTRICT OF COLUMBIA.

BLADE.

Application filed March 9, 1923. Serial No. 623,942.

*To all whom it may concern:*

Be it known that I, JAMES M. MILLER, a citizen of the United States, residing in the city of Washington, District of Columbia, have invented certain new and useful Improvements in Blades, of which the following is a specification.

This invention relates to blades, designed primarily for use in connection with fans and propellers, but it is to be understood that a blade in accordance with this invention can be employed for any purposes wherein it is found applicable, and the invention has for its object to provide, in a manner as hereinafter set forth, a blade including means whereby the fluid, such as air or water, is projected or distributed from the blade as close to its driving shaft as is possible, whereby maximum efficiency in the projecting or distribution of the fluid is obtained with a large decrease in operating power consumption for the driving shaft, under such conditions providing a material saving in operating expenses.

A further object of the invention is to provide, in a manner as hereinafter set forth, a blade, for use for the purpose referred to, including a pair of bodily revolvable oppositely disposed coupled propelling members, each provided with means for reducing resistance of the the fluid, during operation, to a minimum, and whereby on the operation of the blade the suction or direction of travel of the fluid, such as air or water, will be from the front and over the leading side edges of the blade to the back thereof at each end terminal portion, thence along the back of each propelling member in a direction towards and passing off its inner end, at the rear thereof, and directed without waste onto the front of the inner terminal portion of the other member from which it is expelled forwardly, under such conditions providing for the projecting or distributing of the fluid from the central portion of the blade, thereby obtaining maximum efficiency with a material decrease in operating power consumption during the driving of the blade, which results in great saving in operating expenses.

Further objects of the invention are to provide, in a manner as hereinafter set forth, a blade for the purpose referred to, which is simple in its construction and arrangement, strong, durable, compact, readily set up, thoroughly efficient in its use and comparatively inexpensive.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a front elevation of a fan blade, in accordance with this invention.

Figure 2 is an edge view thereof.

Figure 3 is a section on line 3—3, Figure 1.

Figure 4 is a section on line 4—4, Figure 1.

Figure 5 is a section on line 5—5, Figure 1.

Figure 6 is a section on line 6—6, Figure 1.

Figure 7 is a section on line 7—7, Figure 1.

Figure 8 is a front view of a propelling blade, in accordance with this invention.

Figure 9 is an edge view thereof.

Figure 10 is a section on line 10—10, Figure 8.

Figure 11 is a section on line 11—11, Figure 8.

Figure 12 is a section on line 12—12, Figure 8.

Figure 13 is a section on line 13—13, Figure 8.

Figure 14 is a section on line 14—14, Figure 8.

Figure 15 is a section on line 15—15, Figure 8.

Figure 16 is a section on line 16—16, Figure 8.

Figure 17 is a section on line 17—17, Figure 8.

Referring to Figures 1 to 7 of the drawings, a blade in accordance with this invention comprises a body portion consisting of a coupling member and a pair of oppositely disposed propelling members which are fixedly secured to the coupling member and are arranged in spaced relation with respect to their inner ends.

The coupling member consists of a hub 20, which is adapted to be mounted and fixedly secured to a driving shaft, not shown. The hub 20, at one end, is provided with a laterally extending annular flange 21, having formed integral therewith a pair of oppositely extending arms 22, and to each of said arms is fixedly secured, by the holdfast devices 23, a propelling member.

The propelling members are indicated by the reference characters 24 and 25, and as each of these members is of the same construction, but one will be described, as the description of one will apply to the other, and each of the said members is formed from a substantially rectangular body portion having its inner end provided at one corner with a lip 26 of the desired length. The body portion of each of said members is torsionally twisted, and with the angle of torsion gradually increasing from the outer towards the inner end of the body portion.

The body portion from its transverse center to its outer end is upon a compound curve and with the arc of each curve gradually decreasing from said transverse center to the outer end of said body portion.

The body portion from its transverse center to said lip is upon a compound curve but reversely curved with respect to that part of the body portion from its transverse center to its outer end. The curves of the compound curvature of that part of the body portion from its transverse center towards said lip has the arc of each curve gradually decreasing.

The outer end of the body portion is rounded, as at 27, and one corner of the inner end of the body portion is rounded as at 28.

The inner end of a propelling member has its edge positioned at the point of joinder of an arm 22 with the flange 21, and the lip 26 of a propelling member is of such length that its free terminus will be arranged in proximity to the rounded inner corner 28 of the other propelling member when the said members are fixedly secured to the arms 22.

Each of the lips 26 is curvilinear in cross section and extend away from the flange 21, of the hub 20, as clearly shown in Figure 2, and the said lips 26 provide means for directing the fluid from the back of the members onto the front thereof without waste.

The curvature of each of the propelling members reduces to a minimum the resistance of the fluid during the operation of the blade, and owing to the compound curvature of the outer portion of each of the members, the blade acts to cause the suction or direction of travel of the fluid from the front of the blade and over the leading side edges to the back thereof at each end terminal portion, and the curvature of the members further causes the fluid to travel along the back thereof in a direction towards the inner ends of the members, and the fluid passes off the inner ends of the members, and owing to the manner in which the lips are set up the fluid is directed without waste onto the front of the inner terminal portions of said members from which it is expelled forwardly, or rather expelled forwardly from the center of the blade and in close proximity to the driving shaft as is possible, thereby obtaining maximum efficiency. Owing to the reducing of the resistance at the outer terminal portions of the propelling members to a minimum, a material decrease in operating power consumption is had during the driving of the blade and which results in a great saving in operating expenses.

The outer edge of the lip 26 is indicated at 29, and which forms a continuation of one of the side edges of the body portion of the propelling member and the inner edge of the lip, which is indicated at 30, curves in a direction towards the edge 29, thereby providing the free end of the lip 26 pointed, as indicated at 31. When the propelling members are secured to the coupling member they are oppositely disposed with respect to each other and the inner edges 30 of the lip 26 curve away from each other. The angle of torsion which the lips form a continuation of, is such that when the propelling members are secured in position the lips 26 will overhang one relatively to the other, but with the lip of one member projecting in a direction away from the inner terminal portion of the other member.

In Figures 8 to 17, there is illustrated a propeller blade in accordance with this invention, and the said blade comprises a coupling member and a pair of propelling members. The coupling member is indicated by the reference character 32 and is of the same construction as that illustrated in Figures 1 and 2. The propelling members are indicated at 33, 34, and are secured to the coupling member, and further are oppositely disposed with respect to each other. Each of the propelling members is of the same construction, but one will be described, as the description of one will apply to the other.

Each of the propelling members comprises a body portion which is torsionally twisted and with the angle of torsion gradually increasing from the outer towards the inner end of the body portion.

The body portion of each of the propelling members, at its inner end, is formed with a lip 35, curvilinear in transverse section.

The body portion of each of said members is substantially oval in contour, and the lip 35, is substantially semi-oval in contour and projects outwardly at an inclination with respect to the body portion.

The body portion of each of the members 33, 34, from its transverse center to its outer end is upon a compound curve and with each of the curves having its arc gradually increasing from the outer end of the body portion to the transverse center thereof.

The body portion of each of the members 33, 34, from its transverse center towards its inner end is upon a single curve transversely and with the arc of the curve gradually increasing from the transverse center towards said inner end of the body portion.

The body portion of each of the members 33, 34, at one side of its longitudinal center is upon a compound curve, substantially along the lines as shown in Figure 16, and at the other side of its longitudinal center is upon a single curve substantially in a manner as illustrated in Figure 17 of the drawings.

The manner in which the blade, as illustrated in Figures 8 to 17, acts or operates, is the same as that referred to in connection with the blade shown in Figures 1 to 7 of the drawings.

Although the preferred embodiment of the invention is as described and shown, yet it is to be understood that changes in the details of construction can be had which will fall within the light of the invention as claimed.

What I claim is:—

1. In a blade for the purpose set forth a propelling member comprising a body portion torsionally twisted from its outer to its inner end and with the angle of torsion gradually increasing from its outer towards its inner end, said body portion having a forwardly projected inner corner and a forwardly projected lip extended from said inner corner.

2. In a blade for the purpose set forth a propelling member comprising a body portion torsionally twisted from its outer to its inner end and with the angle of torsion gradually increasing from its outer towards its inner end, said body portion having a forwardly projected inner corner and a forwardly projected lip extended from said inner corner, said lip curvilinear in transverse section.

3. In a blade for the purpose set forth a propelling member comprising a body portion torsionally twisted from its outer to its inner end and with the angle of torsion gradually increasing from its outer towards its inner end, said body portion having a forwardly projected inner corner and a forwardly projected lip extended from said inner corner, that part of said body portion from its transverse center to its outer end being upon a compound curve transversely.

4. In a blade for the purpose set forth a propelling member comprising a body portion torsionally twisted from its outer to its inner end and with the angle of torsion gradually increasing from its outer toward its inner end, said body portion having a forwardly projected inner corner and a forwardly projected lip extended from said inner corner, that part of said body portion from its transverse center to its outer end being upon a compound curve transversely, each of the curves of said compound curvature having the arc thereof gradually increasing from the outer end of the body portion to the transverse center thereof.

5. In a blade for the purpose set forth a propelling member comprising a body portion torsionally twisted from its outer to its inner end and with the angle of torsion gradually increasing from its outer towards its inner end, said body portion having a forwardly projected inner corner and a forwardly projected lip extended from said inner corner, that part of said body portion from its transverse center to its outer end being upon a compound curve transversely, and said lip being transversely curved.

6. In a blade for the purpose set forth a propelling member comprising a body portion torsionally twisted from its outer to its inner end and with the angle of torsion gradually increasing from its outer towards its inner end, said body portion having a forwardly projected inner corner and a forwardly projected lip extended from said inner corner, that part of said body portion from its transverse center to its outer end being upon a compound curve transversely, each of the curves of said compound curvature having the arc thereof gradually increasing from the outer end of the body portion to the transverse center thereof, and said lip being transversely curved.

7. A blade comprising a coupling member provided with a pair of oppositely disposed arms, and a pair of oppositely disposed propelling members secured to said arms and with the inner ends of said members spaced from each other, each of said propelling members including a body portion torsionally twisted throughout from its inner towards its outer end and with the angle of torsion gradually increasing from the outer to the inner end of the body portion, and each of said body portions having a forwardly projected inner corner and a forwardly projected lip extended from said inner corner, the lip of one body portion projecting in a direction forwardly from the other body portion and providing a fluid directing means for directing the fluid of the rear of one body portion onto the front of the other body portion.

8. A blade comprising a pair of oppositely disposed propelling members, means for coupling said members together in spaced relation and for securing them to a driving element, each of said members torsionally twisted from its outer to its inner end and further provided at its inner end with an extended lip projected forwardly with respect to its member, said lips projecting in opposite directions with respect to each other and with the lip of one member projecting forwardly with respect to the inner edge of the lip of the other member and constituting means for directing a fluid from the rear of its member onto the front of the other member.

9. A blade comprising a pair of oppositely disposed propelling members, means for coupling said members together in spaced relation and for securing them to a driving element, each of said members torsionally twisted from its outer to its inner end and further provided at its inner end with an extended lip projected forwardly with respect to its member, said lips projecting in opposite directions with respect to each other and with the lip of one member projecting forwardly with respect to the inner edge of the lip of the other member and constituting means for directing a fluid from the rear of its member onto the front of the other member, each of said lips extended from one inner corner of a member and with one lip overhanging the other lip.

In testimony whereof, I affix my signature hereto.

JAMES M. MILLER.